J. W. TALBOT.
SUPPORTING CLEAT FOR SCOOP BOARDS.
APPLICATION FILED MAY 14, 1921.
1,410,137.
Patented Mar. 21, 1922.
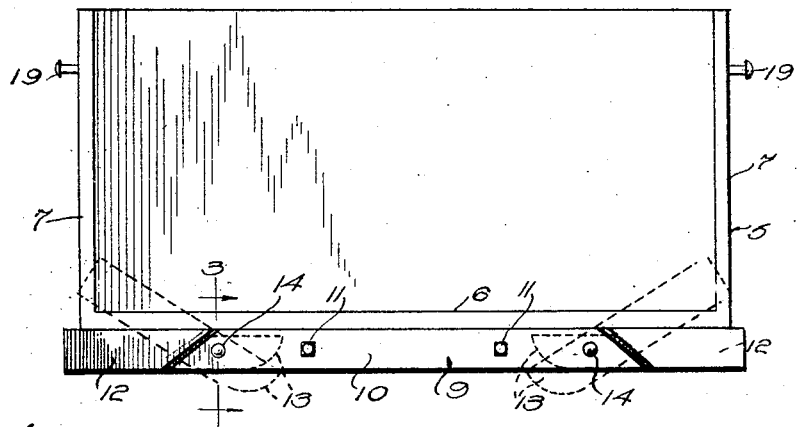
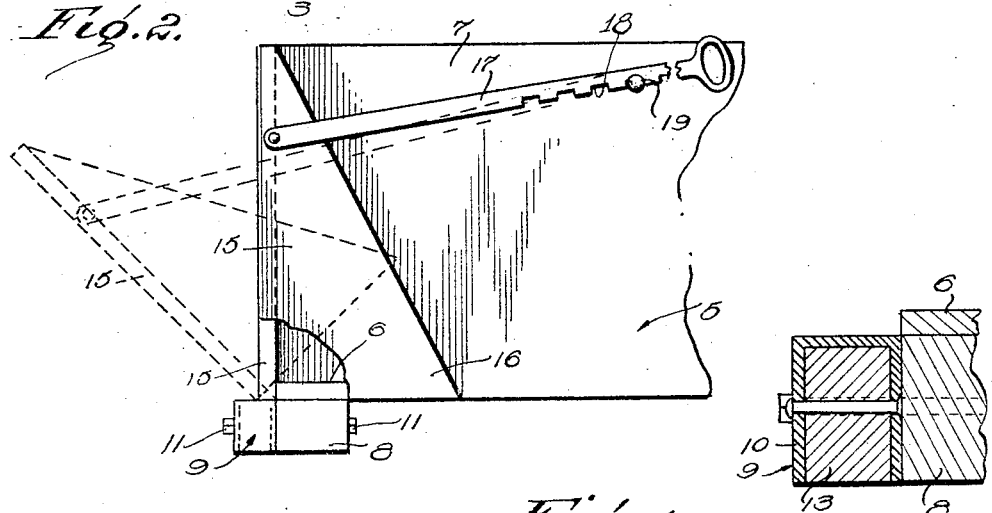
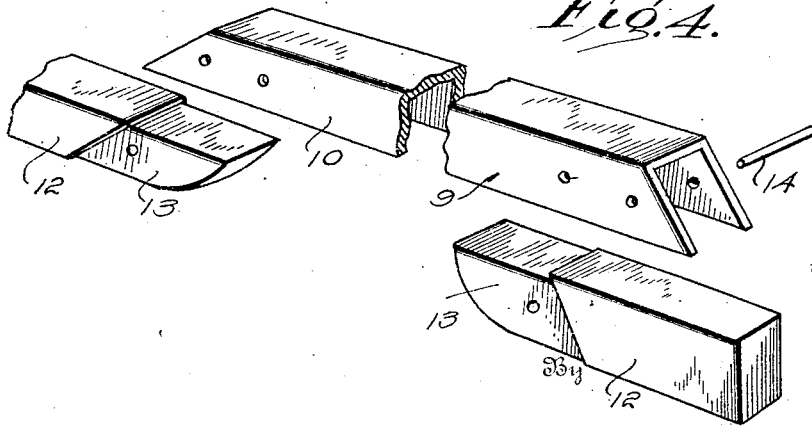
Inventor
J. W. TALBOT
Attorney

UNITED STATES PATENT OFFICE.

JAMES W. TALBOT, OF GILTNER, NEBRASKA.

SUPPORTING CLEAT FOR SCOOP BOARDS.

1,410,137.　　　Specification of Letters Patent.　　Patented Mar. 21, 1922.

Application filed May 14, 1921. Serial No. 469,640.

*To all whom it may concern:*

Be it known that JAMES W. TALBOT, a citizen of the United States, residing at Giltner, in the county of Hamilton and State of Nebraska, has invented certain new and useful Improvements in Supporting Cleats for Scoop Boards, of which the following is a specification.

My invention relates to improvements in wagon bodies, and has particular reference to the means for supporting the scoop board or gate of the same.

As is well known, the scoop board or gate of a farm wagon is ordinarily supported by a cleat, which is fastened to the rear end of the wagon body. This cleat projects rearwardly and laterally beyond the wagon body. When the grain or the like in the wagon body is being dumped into the elevator, the rear end of the wagon body is swung downwardly, and the ends of the cleat frequently strike a portion of the elevator, and are broken thereby.

In accordance with my invention, I provide a cleat which is fastened to the rear end of the wagon body and extends longitudinally and laterally beyond the body. This cleat is equipped with pivoted end members, which are locked against downward swinging movement, but are free to swing upwardly. These end members constitute extensions of the body portion of the cleat, and serve to support portions of the scoop board or gate. When the grain is dumped from the wagon body, the scoop board or gate is removed, and should the end members strike portions of the elevator, they are swung forwardly, and hence do not break.

An important object of the invention is to provide a cleat of the above mentioned character, which is simple in construction, cheap to manufacture, strong and durable, and may be applied to a wagon body of the ordinary type, without materially altering the construction thereof.

In the accompanying drawings forming a part of this specification, and in which like numerals are employed to designate like parts throughout the same, Fig. 1 is a side elevation of a supporting cleat embodying my invention, showing the same in place upon a wagon body, with the scoop board removed, Fig. 2 is an end elevation of the same, Fig. 3 is a transverse section on line 3—3 of Fig. 1, and, Fig. 4 is a perspective view of the supporting cleat, parts being separated for the purpose of illustration.

In the drawings, wherein for the purpose of illustration is shown a preferred embodiment of my invention, the numeral 5 designates a wagon body as a whole, such as a farm or grain wagon body. This wagon body includes a floor 6 and sides 7. A transverse cleat 8 is arranged beneath the bottom 6 and is rigidly secured thereto, as is customary. This cleat does not project longitudinally or laterally beyond the wagon body.

The numeral 9 designates my improved supporting cleat, as a whole, comprising a body portion 10, which is channelled, or inverted U-shape in cross section. This body portion has transverse openings formed therein for receiving bolts 11, which serve to rigidly attach the same to the cleat 8. Of course the supporting cleat 9 may be secured to the rear end of the wagon body by any other suitable means. The body portion 10 carries at its ends end members 12, which when horizontally arranged form in effect continuations of the body portion 10. Each end member is provided with a reduced portion 13, projecting into the body portion 10, and pivotally connected therewith by a pin or rivet 14. As the lower side of the supporting cleat 10 is open, it is obvious that the end members are free to swing upwardly, when contacting with an obstruction as a portion of the elevator, but the same cannot swing downwardly below their alignment with the body portion 10. The upper surface of the end members are flush with the upper surface of the body portion 10.

The numeral 15 designates a scoop board or gate, having end portions 16, which may be adjustably and detachably connected with the sides 7 by links 17 or any other suitable means. These links may have notches 18, for detachably engaging elements 19. As the invention is not concerned with the particular type of device for holding the scoop gate in the opened and closed position, the links have been shown simply as illustrative of some form of means.

It will be seen that the scoop gate, when opened or closed, rests upon the supporting cleat 9, and is wholly supported thereby.

When the grain or the like in the wagon body is to be dumped, the scoop board is removed from the wagon body, and the rear end of the wagon body lowered. If the end members 12 contact with parts of the elevator, during this lowering operation, such end members will be swung upwardly, and hence liability of breakage of the supporting cleat is avoided.

It is to be understood that the form of my invention shown is to be taken as a preferred example of the same, and that various changes in the shape, size and arrangement of parts may be resorted to without departing from the spirit of my invention or the scope of the subjoined claims.

Having thus described my invention, I claim:

1. The combination with a wagon body, of a supporting cleat secured to the rear end thereof and projecting outwardly beyond the body, said cleat having pivoted end members, and a scoop board adapted to be supported upon the supporting cleat.

2. A supporting cleat for supporting a scoop board of a wagon body, said cleat embodying a body portion and pivoted end members adapted to swing upwardly, and means to secure the body portion of the cleat to the wagon body.

3. A supporting cleat for supporting a scoop board of a wagon body, said cleat embodying a hollow body portion, and end members having portions thereof pivoted within the hollow body portion, said end members being incapable of swinging downwardly from the normal position with relation to said body portion and capable of swinging upwardly from such normal position with relation thereto, and means to secure said body portion of the cleat to the wagon body.

4. A supporting cleat for supporting a scoop board of a wagon body, comprising a body portion formed inverted U-shaped in cross section, end members having reduced ends extending into the ends of said body portion, means for pivoting the end members to the body portion, and means for securing said body portion to the rear end of the wagon body.

In testimony whereof I affix my signature.

JAMES W. TALBOT.